(12) United States Patent
Zuo

(10) Patent No.: US 7,798,858 B1
(45) Date of Patent: Sep. 21, 2010

(54) CHIP CARD HOLDER

(75) Inventor: Zhou-Quan Zuo, Shenzhen (CN)

(73) Assignees: Shenzhen Futaihong Precision Industry Co., Ltd., Shenzhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/578,989

(22) Filed: Oct. 14, 2009

(30) Foreign Application Priority Data

Mar. 24, 2009 (CN) .................... 2009 1 0301088

(51) Int. Cl.
*H01R 24/00* (2006.01)
(52) U.S. Cl. ....................... 439/630; 439/326
(58) Field of Classification Search ............ 439/630, 439/326
See application file for complete search history.

(56) References Cited

U.S. PATENT DOCUMENTS

| | | | | |
|---|---|---|---|---|
| 4,843,223 | A * | 6/1989 | Shino ................. | 235/487 |
| 5,933,328 | A * | 8/1999 | Wallace et al. .......... | 361/737 |
| 6,602,096 | B1 * | 8/2003 | Kronestedt et al. ....... | 439/630 |
| 7,131,871 | B1 * | 11/2006 | Zuo et al. ............. | 439/630 |
| 7,238,038 | B2 * | 7/2007 | Kumagai .............. | 439/326 |
| 2005/0208814 | A1 * | 9/2005 | Tsai et al. ............ | 439/326 |
| 2005/0255753 | A1 * | 11/2005 | Buschmann ........... | 439/630 |
| 2006/0205258 | A1 * | 9/2006 | Cho et al. ............ | 439/326 |
| 2006/0270263 | A1 * | 11/2006 | Hirata ................ | 439/326 |

\* cited by examiner

*Primary Examiner*—Tho D Ta
(74) *Attorney, Agent, or Firm*—Steven M. Reiss

(57) ABSTRACT

An exemplary chip card holder used in a portable electronic device for holding a chip card therein is provided. The chip card holder includes a body member and a cover, the body member has a cover accommodating chamber recessed in a bottom wall thereof. The cover accommodating chamber has at least one assembling portion. The cover is configured for holding the chip chard therewith and is accommodated in the cover accommodating chamber. The cover has at least one installing portion detachably, slidably, and rotatably mounted to the at least one assembling portion.

13 Claims, 7 Drawing Sheets

CHIP CARD HOLDER

BACK GROUND

1. Technical Field

The exemplary disclosure generally relates to a chip card holder for a portable electronic device.

2. Description of Related Art

With the development of wireless technology, portable electronic devices are becoming widely used and multifunctional. Portable electronic devices such as mobile phones typically have chip cards (e.g., SIM card) for storing usable information. It is necessary to provide chip card holders for holding/securing the chip card within the portable electronic devices.

The chip card holder usually defines a receiving space and a holding member. The chip card can be partially received and held in the receiving space by the holding member. Accordingly, the chip card has an exposed portion which is not received in the receiving space. The exposed portion is used for the removal (e.g., to be pulled by users) of the chip card out of the receiving space. However, the exposed portion is usually too small and therefore difficult for a user to grasp in removing the chip card from the holder.

Therefore, there is room for improvement within the art.

BRIEF DESCRIPTION OF THE DRAWINGS

Many aspects of the exemplary chip card holder can be better understood with reference to the following drawings. These drawings are not necessarily drawn to scale, the emphasis instead being placed upon clearly illustrating the principles of the present chip card holder. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
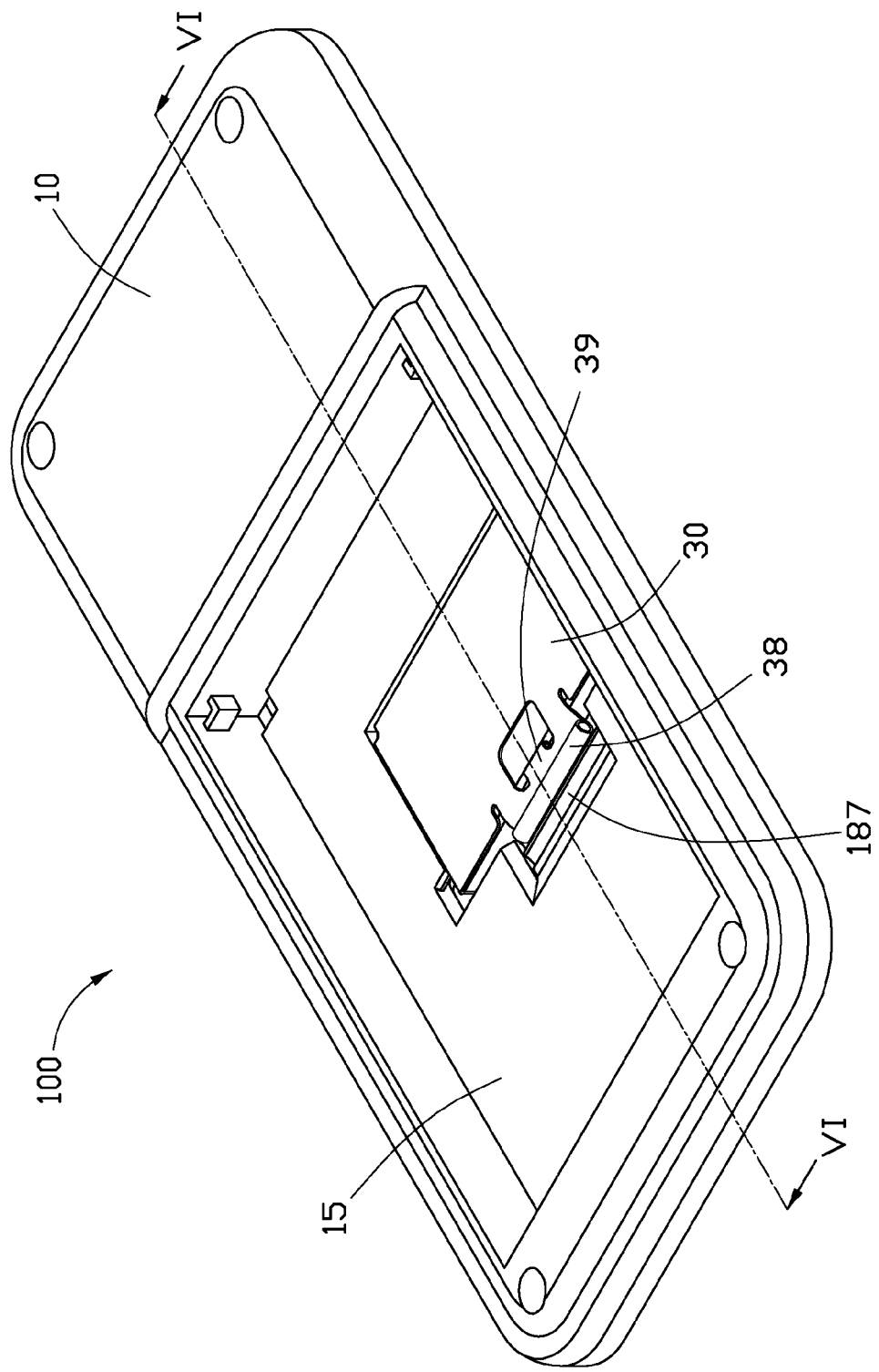
FIG. 1 shows a perspective view of a chip card holder in a closed state according to an exemplary embodiment.
Figure 2:
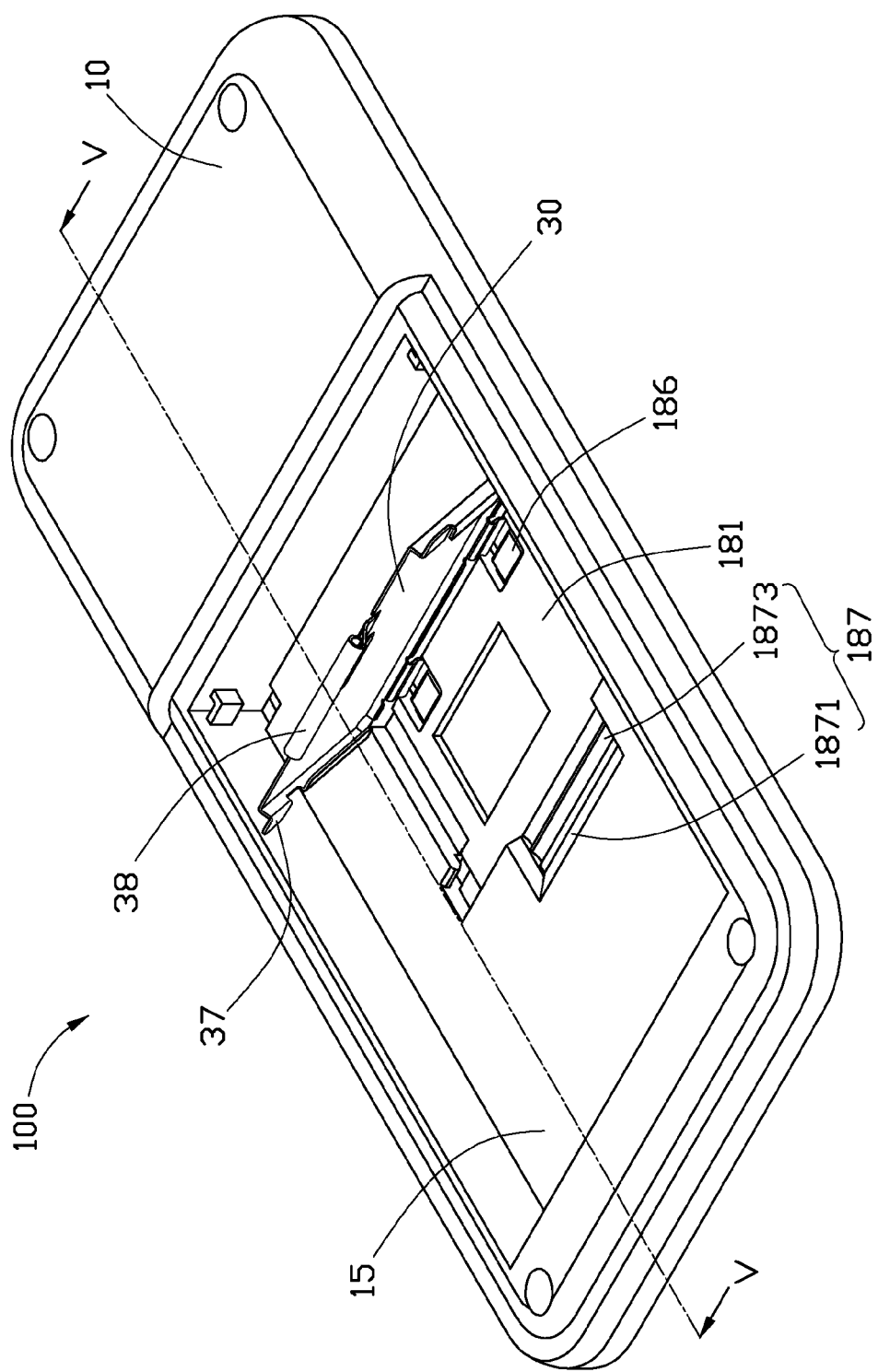
FIG. 2 shows a perspective view of the chip card holder in an opened state.

FIG. 1 and FIG. 2 show an exemplary embodiment of a chip card holder 100 configured for assembling and holding a chip card 70 (shown in FIG. 3) therein. The chip card holder 100 includes a body member 10 and a cover 30 detachably assembled to the body member 10.

Figure 3:
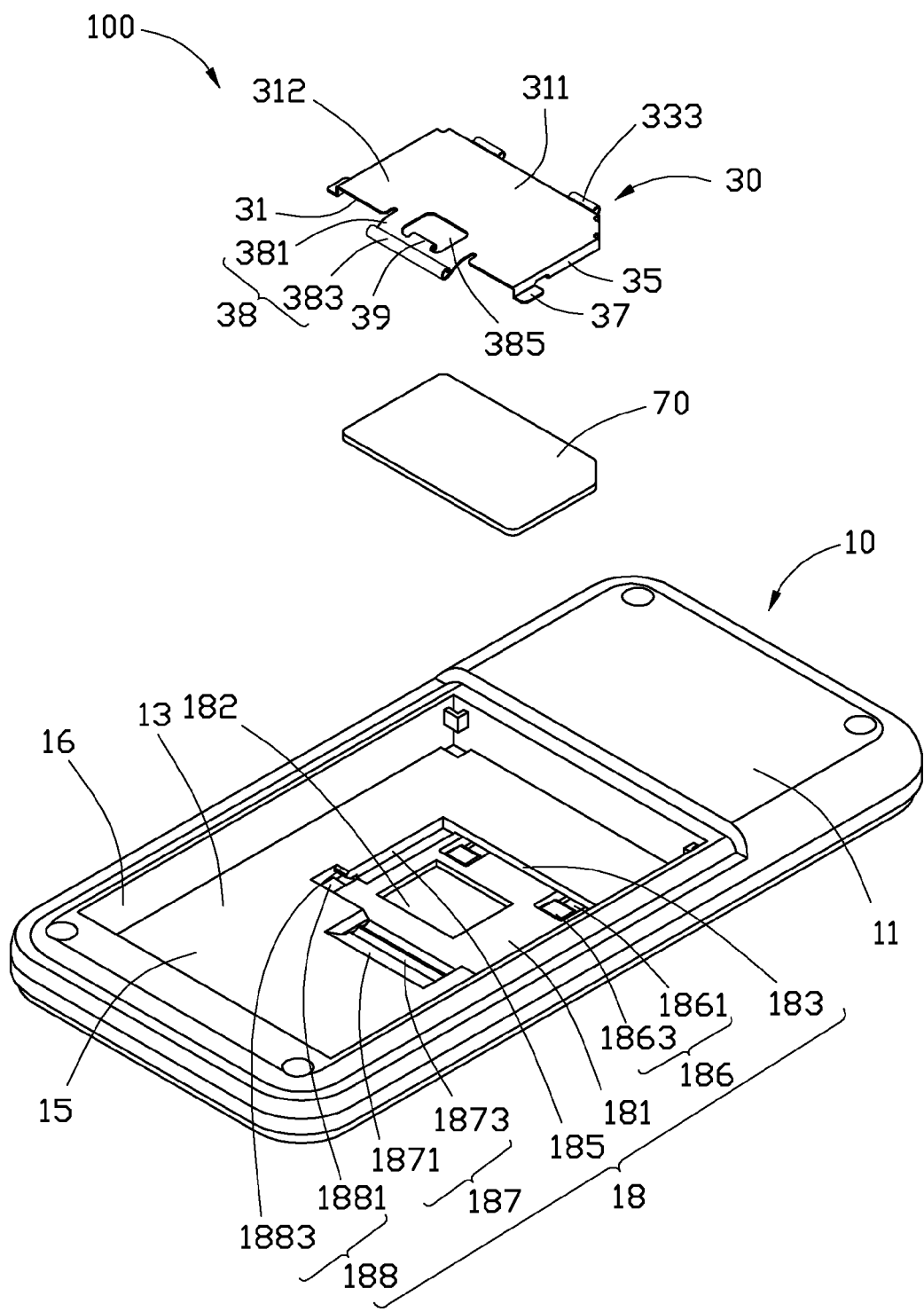
FIG. 3 shows an exploded perspective view of the chip card holder.
Figure 4:
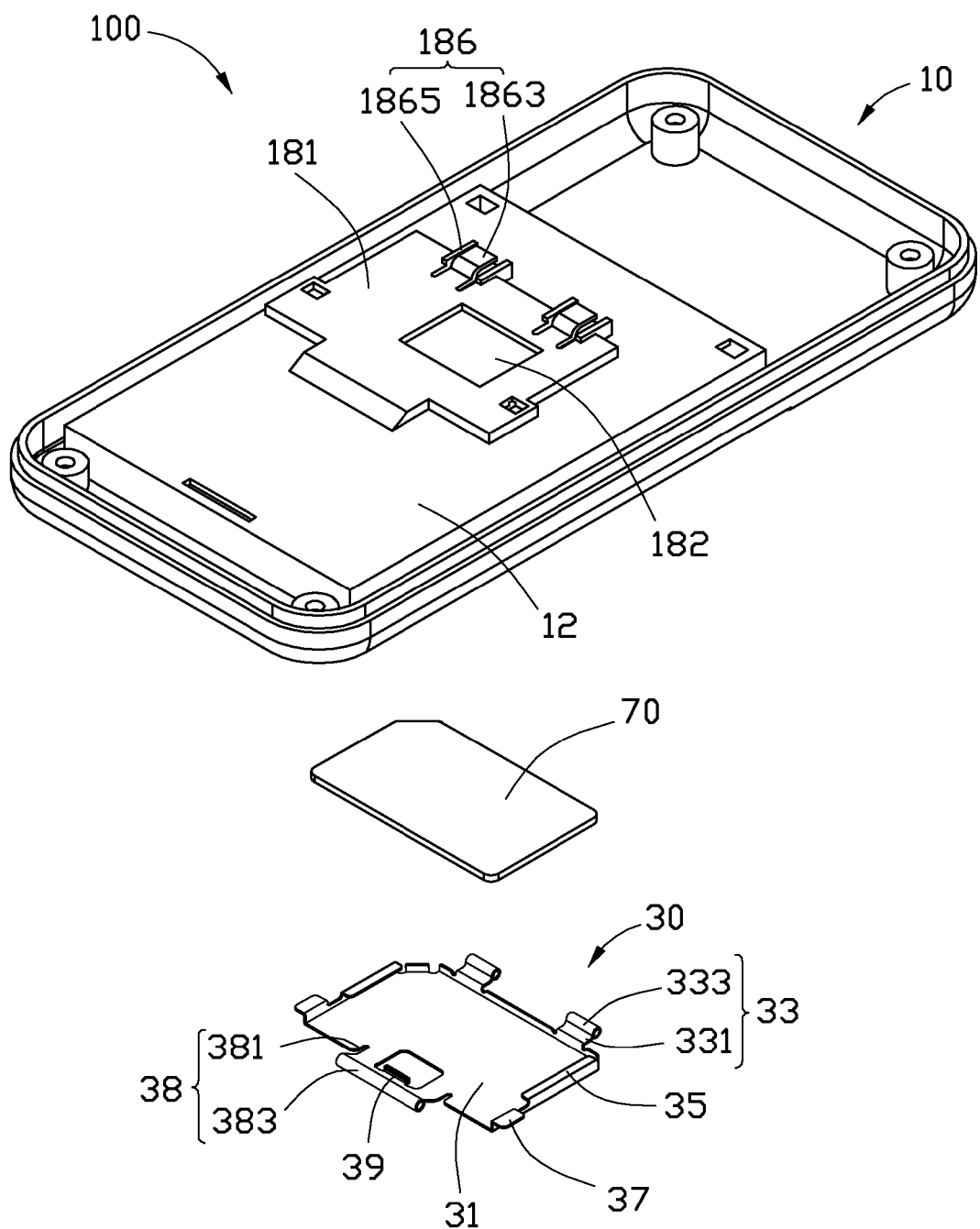
FIG. 4 is similar to FIG. 3, but viewed from another aspect.
Figure 5:
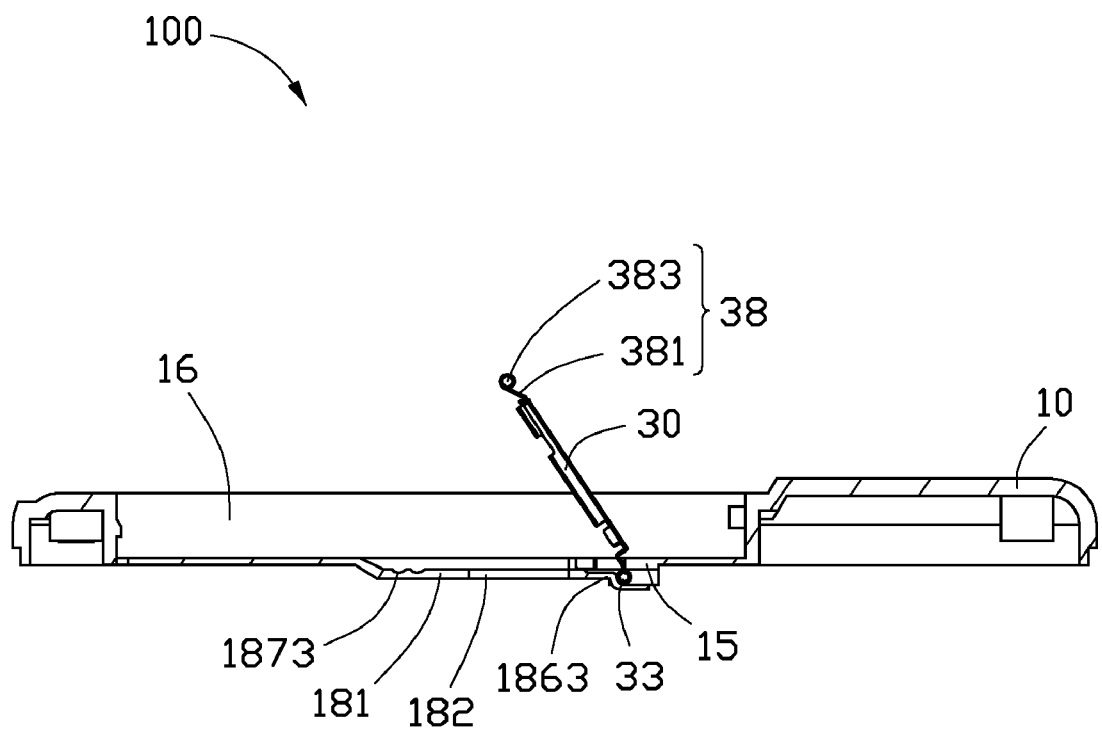
FIG. 5 shows a cross-sectional view of the chip card holder along line V-V of FIG. 2.

Also referring to the FIG. 3 and FIG. 4, the body member 10 may be a back housing of a portable electronic device e.g. a mobile phone. The body member 10 includes an outer surface 11 and an inner surface 12 opposite to the outer surface 11. The body member 10 defines a battery assembling cavity 13 for receiving a battery (not shown) therein. The battery assembling cavity 13 is recessed from the outer surface 11 to the inner surface 12 thereby forming a bottom wall 15 and sidewalls 16 surrounding the battery assembling cavity 13. The bottom wall 15 defines a cover accommodating chamber 18 recessed therein for assembling and accommodating the cover 30 therein. The cover accommodating chamber 18 includes a bottom portion 181, two parallel first side portions 183, two parallel second side portions 185, two assembling portions 186, a clasp portion 187 and two latching portions 188. The two second side portions 185 both connect with the two opposite ends of the two first side portions 183. The bottom portion 181 defines a through hole 182. The cover accommodating chamber 18 communicates with both the battery assembling cavity 13 and the through hole 182.

The two assembling portions 186 are disposed at two ends of the bottom portion 181, spaced apart from each other, adjacent to one first side portion 183. Each assembling portion 186 includes an assembling hole 1861, an elastic tongue 1863 and two guiding walls 1865. The assembling hole 1861 is defined through the bottom portion 181, adjacent to the first side portion 183. The elastic tongue 1863 is substantially L-shaped, and downwardly extends from the bottom portion 181 towards the inner surface 12, and partially covers the assembling hole 1861. The two guiding walls 1865 protrude from the bottom portion 181 towards the inner surface 12. The two guiding walls 1865 are disposed at the two opposite sides of the elastic tongue 1863. The assembling hole 1861, the elastic tongue 1863 and the two guiding walls 1865 cooperatively form a cavity.

The clasp portion 187 is disposed at a middle portion of the other first side portion 183, opposite to the two assembling portions 186. The clasp portion 187 includes a clasp chamber 1871 and two clasp slots 1873. The clasp chamber 1871 is recessed in the bottom wall 15 and communicates with the cover accommodating chamber 18. The two clasp slots 1873 are substantially semicircular bar shaped, and are recessed within the clasp chamber 1871 parallel to the first side portion 183 and spaced apart from each other.

The two latching portions 188 are disposed at one end of the two second side portions 185 far away from the two assembling portions 186 respectively. Each latching portion 188 includes a clasp gap 1881 and a lock block 1883. The clasp gap 1881 is recessed in the second side portion 185. The clasp gap 1881 communicates with both the battery assembling cavity 13 and the cover accommodating chamber 18. The lock block 1883 projects from the bottom wall 15 and extends into the clasp gap 1881. The lock block 1883 is used to clasp the cover 30.

The cover 30 is detachably assembled to the bottom wall 15 of the body member 10 to cover the cover accommodating chamber 18. The cover 30 includes a top wall 31, two installing portions 33, two accommodating sidewalls 35, two latching arms 37, a clasp section 38 and a resisting portion 39. The top wall 31 includes an assembling end 311 and a clasp end 312 opposite to the assembling end 311. The two installing portions 33 are disposed at the clasp end 312 spaced apart from each other, corresponding to the two assembling portions 186. Each installing portion 33 includes a connecting arm 331 extending out from the top wall 31 and a guiding portion 333. The guiding portion 333 is substantially hollow cylindrical, and is disposed at the end of the connecting arm 331. The guiding portions 333 are configured for being detachably, slidably and rotatably assembled within the assembling portion 186.

The two accommodating sidewalls 35 are substantially L-shaped, and are disposed at the opposite sides of the top wall 31. The two accommodating sidewalls 35 extend and are bent from opposite sides of the top wall 31 and form a chip card assembling space together with the top wall 31 to assemble the chip card 70 therein.

The two latching arms 37 are substantially L-shaped, and are bent away from opposite sides of the top wall 31 adjacent to the clasp end 312. The latching arms 37 are configured for latching with the corresponding two latching portions 188 of the cover accommodating chamber 18 respectively.

The clasp section 38 is disposed at the clasp end 312 of the top wall 31, corresponding to the clasp portion 187 of the cover accommodating chamber 18. The clasp section 38 includes an extending arm 381 and a clasp block 383. In the present embodiment, the extending arm 381 extends out and bends away from the middle portion of the clasp end 312 of the top wall 31. The extending arm 381 defines a gap 385 therethrough, adjacent to the joint of the clasp end 312 and the clasp section 38. The clasp block 383 is substantially post shaped, and is disposed at the end of the extending arm 381. The clasp block 383 is configured for clasping with the clasp slot 1873 of the clasp portion 187.

The resisting portion 39 protrudes from the clasp end 312 of the top wall 31, adjacent the gap 385. The resisting portion 39 is disposed at the same side with the two accommodating sidewalls 35, and is configured for resisting with the chip card 70 assembled to the cover 30.

When assembling the chip card holder 100, the two installing portions 33 of the assembling end 311 of the cover 30 are inserted into the corresponding two assembling portions 186 of the cover accommodating chamber 18 of the body member 10 respectively. The two guiding portions 333 of the installing portion 33 penetrate through the corresponding two assembling holes 1861 respectively. Each guiding portion 333 is elastically resisted between the corresponding elastic tongue 1863 and the inner surface 12 of the bottom portion 15. The guiding portion 333 of the installing portion 33 is slidably to and rotatably engaged with the assembling portion 186; accordingly, the cover 30 is slidably and rotatably assembled to body member 10.

Figure 6:
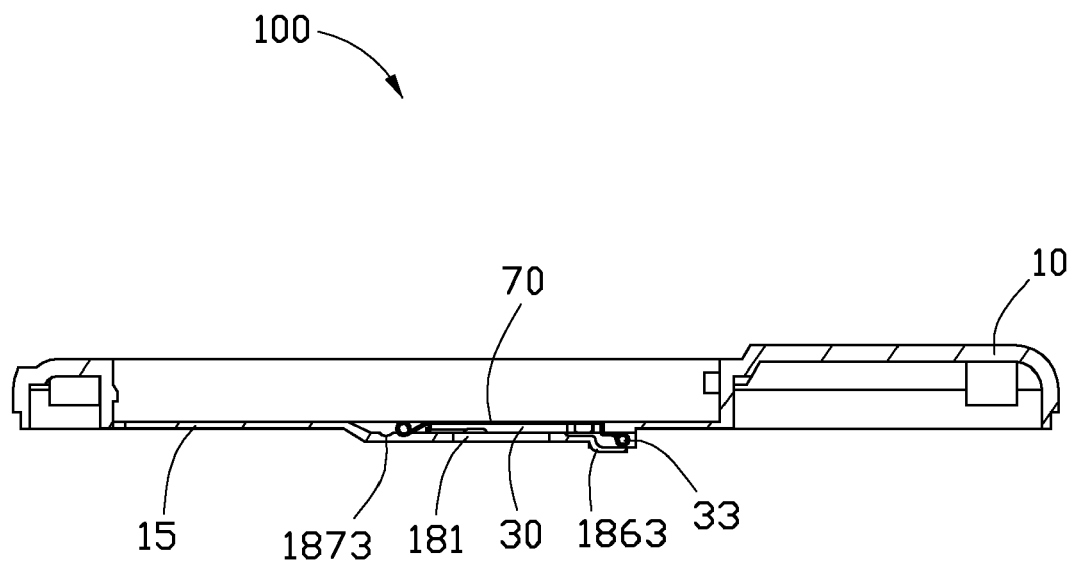
FIG. 6 shows a cross-sectional view of the chip card holder along line VI-VI of FIG. 1.
Figure 7:
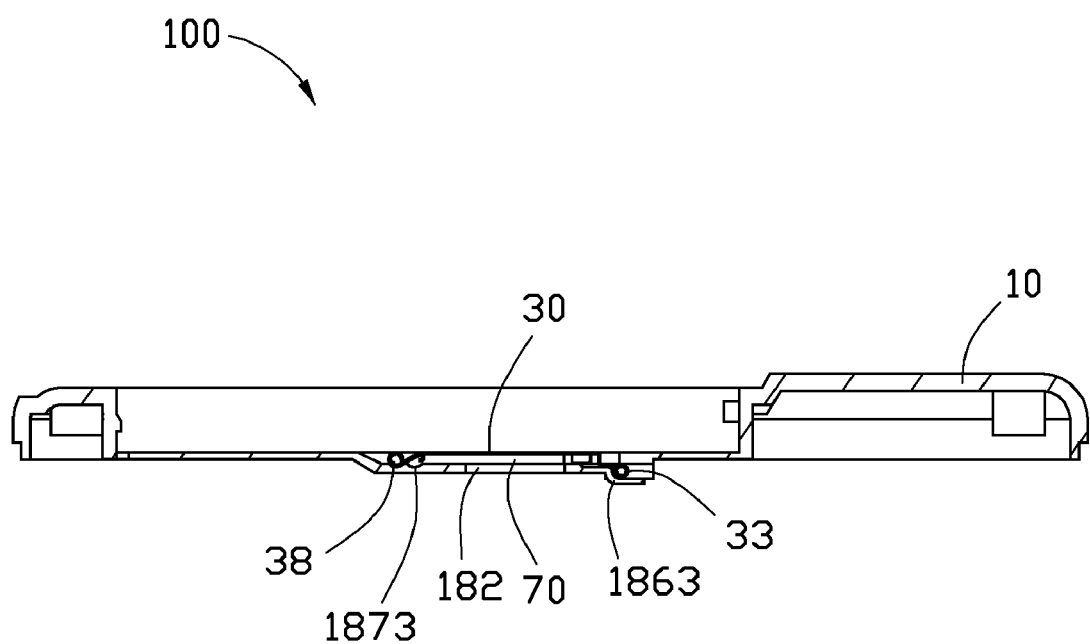
FIG. 7 is similar to FIG. 6, shows another cross-sectional view of the chip card holder in a closed state.

Also referring to FIG. 6 and FIG. 7, when the chip card 70 is mounted to the chip card holder 100, the chip card 70 is inserted into and accommodated within the chip card assembling space of the cover 30. The cover 30 is rotated relative to the body member 10 toward the bottom portion 15 and accommodated within the cover accommodating chamber 18. The two latching arms 37 of the cover 30 penetrate into the corresponding two clasp gaps 1881 of the cover accommodating chamber 18 respectively, and the clasp block 383 of the clasp section 38 of the cover 30 clasps with the corresponding one clasp slot 1873 of the clasp portion 187 simultaneously. Then, the cover 30 is pushed to slide toward the assembling portion 186 till the two latching arms 37 latch with the corresponding two latching portions 188 of the cover accommodating chamber 18 respectively and the clasp block 383 of the cover 30 clasps with the other clasp slot 1873 of the clasp portion 187 simultaneously to prevent the cover 30 detaching from the bottom wall 15.

When the chip card 70 needs to be removed from the chip card holder 100, the cover 30 is pulled to slide out from the assembling portion 186 till the two latching arms 37 detach with the corresponding two latching portions 188 of the cover accommodating chamber 18 respectively. The clasp block 383 of the cover 30 is slided and clasps with the clasp slot 1873 far away from the cover accommodating chamber 18 simultaneously to detach the cover 30 from the bottom wall 15. The cover 30 is rotated relative to the body member 10 away from the bottom portion 15 to take out the chip card 70.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chip card holder for holding a chip card therein, comprising:
    a body member having a cover accommodating chamber recessed in a bottom wall thereof; the cover accommodating chamber having at least one assembling portion; and
    a cover for holding the chip card therewith and being accommodated in the cover accommodating chamber, and having at least one installing portion detachably, slidably, and rotatably mounted to the at least one assembling portion;
    wherein the cover accommodating chamber further includes a bottom portion, the assembling portion includes an assembling hole and an elastic tongue; the assembling hole is defined through the bottom portion; the elastic tongue extends from the bottom portion and partially covers the assembling hole; the installing portion defines a guiding portion configured for slidably and rotatably resisted between the elastic tongue and the bottom portion.

2. The chip card holder as claimed in claim 1, wherein the assembling portion further includes two guiding walls protruding from the bottom portion and being disposed at the two sides of the elastic tongue respectively opposite to each other; the guiding portion is slidably assembled with the two guiding walls.

3. The chip card holder as claimed in claim 1, wherein the cover accommodating chamber further includes a clasp portion disposed opposite to the two assembling portions; the cover further includes a clasp section disposed opposite to the two installing portions for clasping with the clasp portion of the cover accommodating chamber.

4. The chip card holder as claimed in claim 3, wherein clasp portion includes a clasp chamber and two clasp slots, the clasp chamber is recessed from the bottom wall of the body member and communicates with the cover accommodating chamber; the two clasp slots are spaced recessed within the clasp chamber; the clasp section includes an extending arm and a clasp block, the clasp block clasps with one clasp slot of the clasp portion correspondingly.

5. The chip card holder as claimed in claim 4, wherein the cover accommodating chamber further includes two parallel side portions and two latching portions, the two latching portions are disposed at the two side portions respectively opposite to each other; the cover further includes two latching arms bent away from the two opposite sides of the cover and configured for latching with the corresponding two latching portions of the cover accommodating chamber respectively.

6. The chip card holder as claimed in claim 5, wherein the latching portion includes a clasp gap recessed in the side portion communicating with the cover accommodating chamber and a lock block disposed within the clasp gap to clasp with corresponding latching arm of the cover.

7. The chip card holder as claimed in claim 6, wherein the cover further includes two substantially L-shaped accommodating sidewalls extending and bending from two opposite sides of the cover and form a chip card assembling space together with the cover to assemble the chip card therein.

8. The chip card holder as claimed in claim 7, wherein the cover further includes a resisting portion protruding from the cover adjacent to the clasp section and disposed at the same side with the two accommodating sidewalls.

9. A chip card holder used in a portable electronic device for holding a chip card therein, comprising:
- a body member having an outer surface and a battery assembling cavity recessed in the outer surface for assembling a battery therein; the bottom wall of the battery assembling cavity defining a cover accommodating chamber recessed therein; the cover accommodating chamber having at least one assembling portions; and
- a cover for holding the chip card therewith and being accommodated in the cover accommodating chamber, and having at least one installing portion detachably, slidably, and rotatably mounted to the at least one assembling portion;
- wherein the cover accommodating chamber further includes a bottom portion, the assembling portion includes an assembling hole and an elastic tongue; the assembling hole is defined through the bottom portion; the elastic tongue extends from the bottom portion and partially covers the assembling hole; the installing portion defines a guiding portion configured for slidably and rotatably resisted between the elastic tongue and the bottom portion.

10. The chip card holder as claimed in claim 9, wherein the cover includes a top wall and two accommodating sidewalls, the top wall includes an assembling end and an opposite clasp end; the two accommodating sidewalls are substantially L-shaped extending and bending from two opposite sides of the top wall and form a chip card assembling space together with the top wall to assemble the chip card therein.

11. The chip card holder as claimed in claim 10, wherein the cover accommodating chamber further includes two parallel side portions and two latching portions, the two latching portions are disposed at the two side portions respectively opposite to each other; the cover further includes two latching arms bent away from the two opposite sides of the cover and configured for latching with the corresponding two latching portions of the cover accommodating chamber respectively.

12. The chip card holder as claimed in claim 11, wherein the cover accommodating chamber further includes a clasp portion disposed opposite to the two assembling portions; the cover further includes a clasp section disposed opposite to the two installing portions for clasping with the clasp portion of the cover accommodating chamber.

13. The chip card holder as claimed in claim 12, wherein clasp portion includes a clasp chamber and two clasp slots, the clasp chamber is recessed from the bottom wall of the body member and communicates with the cover accommodating chamber; the two clasp slots are spaced recessed within the clasp chamber; the clasp section includes an extending arm and a clasp block, the clasp block clasps with one clasp slot of the clasp portion correspondingly.

\* \* \* \* \*